Dec. 1, 1959   B. S. PURINTON   2,915,222
FLOWER WATERING MECHANISMS
Filed March 22, 1956

INVENTOR.
BERNARD S. PURINTON

United States Patent Office 2,915,222
Patented Dec. 1, 1959

2,915,222

FLOWER WATERING MECHANISMS

Bernard S. Purinton, Shippenville, Pa.

Application March 22, 1956, Serial No. 573,289

4 Claims. (Cl. 222—175)

This invention relates to flower watering mechanisms and particularly to a device for delivering fluid to flowers at elevated and difficultly accessible places. There has long been a need for some means for delivering water and nutrient solutions to potted flowers and cut flowers in hanging pots or in pots or vases which are spaced behind furniture or other objects so as to be inaccessible by ordinary watering cans and similar known watering methods.

I provide a pair of substantially flat members hinged together along one edge, a hollow flexible water-tight bag fixed between said members to be compressed when the members are brought together, and a flexible hollow elongated delivery means connected to said bag whereby fluid may be delivered from the bag to spaced points. Preferably, the hinged flat members are provided with holding means for carrying the members with the bag therebetween under the arm of the user so that pressure of the arm on the flat members causes fluid to be ejected from the bag through the delivery means.

I have generally described certain of the purposes, advantages and objects of my invention in the foregoing statement. Other objects, advantages and purposes of my invention will be apparent from a consideration of the following description and the accompanying drawings in which Figure 1 is a side elevation of a preferred embodiment of the flower watering mechanism of my invention;

Figure 1:
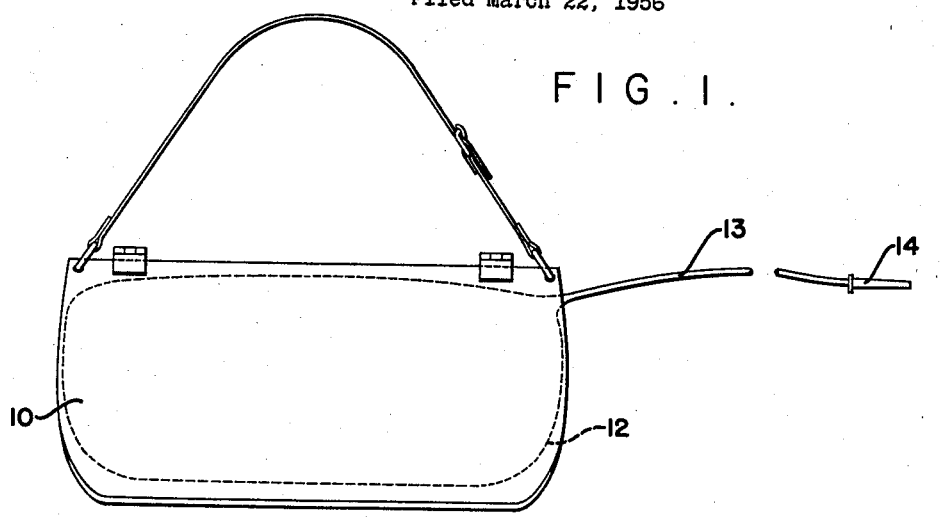
Figure 2:
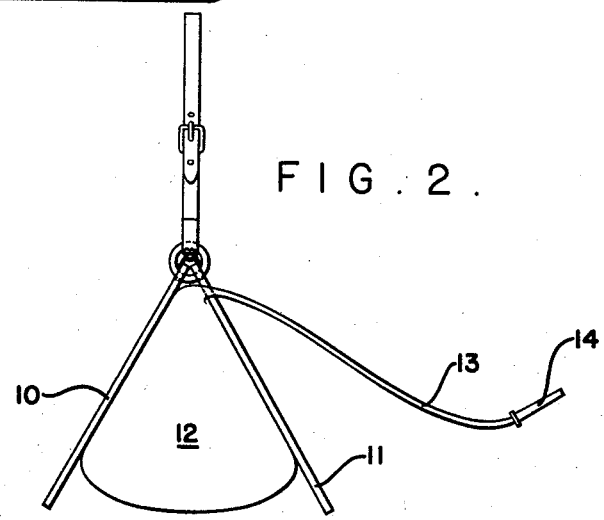
Figure 2 is an end elevation of the embodiment of Figure 1.
Figure 3:
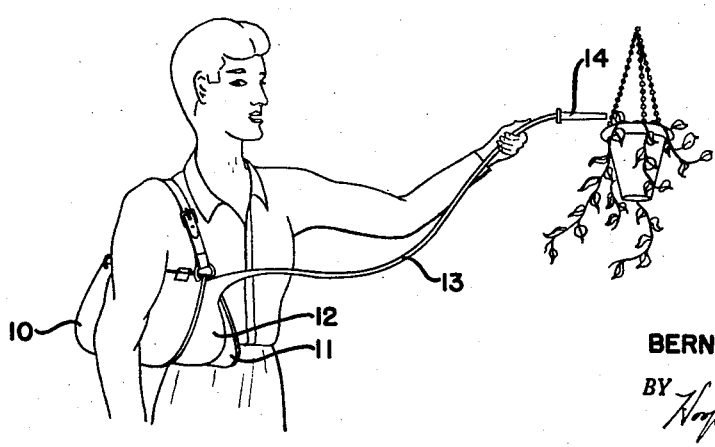
Figure 3 is an isometric view of the embodiment of Figures 1 and 2 illustrating its mode of use.

Referring to the drawings, I have illustrated a pair of substantially flat members 10 and 11 hinged together along one edge to open and close in a manner similar to pages of a book. A plastic water-proof bag 12 is held between the members 10 and 11 so that closing the members compresses the bag 12. An elongated flexible delivery tube 13 of plastic is attached to the bag adjacent the top thereof. A nozzle 14 is provided on the tube 13 to direct the flow of fluid ejected from the bag 12 through the tube 13 upon bringing the members 10 and 11 together. A carrying strap 15 is attached to the flat members 10 and 11 adjacent the hinge between them so that the mechanism may be readily carried beneath the arm of a user.

The flower watering mechanism of this invention is used in the following manner. The bag 12 is filled with fluid. The shoulder strap 15 is placed over the shoulder of the user with the flat members 10 and 11 opened from one another and beneath the arm 16 of the user. The filled bag 12 thus lies between the two flat members 10 and 11 beneath the user's arm. The nozzle 14 is directed to the point to which fluid is to be delivered, as for example hanging flower pot 17, the two flat members 10 and 11 are pressed toward one another by the user's arm 16 and fluid is ejected from the bag 12 through tube 13 and nozzle 14 to the pot 17.

It is apparent from the foregoing description that the structure of this invention provides a simple expeditious mechanism for delivering fluid to inaccessible or difficultly accessible flower pots and the like.

While I have illustrated and described a presently preferred embodiment of my invention, it will be understood that the invention may be otherwise embodied within the scope of the following claims.

I claim:

1. A flower watering mechanism and the like comprising a pair of substantially flat members hinged together along one edge, a hollow flexible water-tight bag fixed between said members to be compressed when the members are brought together, flexible holding means operatively connected to both said members and passing over the shoulder of a user and of such length as to dispose said edges under the armpits of the user whereby said hollow flexible watertight bag may be compressed by said members by the action of the user's arms against the outermost member, and a flexible hollow elongated delivery means connected to said bag whereby fluid may be delivered from the bag to spaced points.

2. A flower watering mechanism and the like comprising a pair of substantially flat members hinged together along one edge, a hollow flexible compressible water-retaining bag fixed to at least one of the flat members to lie between said members, flexible holding means operatively connected to both of said members and passing over the shoulder of the user and being of such length as to dispose said edges under the arm pits of the user whereby said hollow flexible water retaining bag may be compressed by said members by the action of the user's arms against the outermost member, and flexible hollow delivery means connected to said bag adjacent the hinge between the flat members whereby fluid may be delivered from said bag when the flat members are pressed together.

3. A flower watering device as claimed in claim 2 wherein the bag is an elliptical plastic bag.

4. A flower watering device as claimed in claim 2 wherein the delivery means is an elongated flexible tube with a fluid directing nozzle at the end remote from the bag.

References Cited in the file of this patent

UNITED STATES PATENTS

| | | |
|---|---|---|
| 103,640 | Merritt | May 31, 1870 |
| 1,134,656 | Willet | Apr. 6, 1915 |
| 1,592,379 | Merle | July 13, 1926 |
| 2,092,924 | Lewis | Sept. 14, 1937 |
| 2,574,931 | Nason | Nov. 31, 1951 |